(12) United States Patent
Gailloux et al.

(10) Patent No.: US 8,135,388 B1
(45) Date of Patent: Mar. 13, 2012

(54) MANAGING COMMUNICATION NETWORK CAPACITY

(75) Inventors: Michael A. Gailloux, Overland Park, KS (US); Kenneth Samson, Belton, MO (US); Gautam M. Shah, Lake Forest, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 669 days.

(21) Appl. No.: 12/350,066

(22) Filed: Jan. 7, 2009

(51) Int. Cl.
*H04L 12/58* (2006.01)
*H04M 1/725* (2006.01)

(52) U.S. Cl. .............. 455/412.1; 455/405; 455/406; 455/407; 455/408; 455/409; 455/410; 455/418; 370/310.2; 370/328; 379/111; 379/114.28; 379/127.02

(58) Field of Classification Search .............. 455/409, 455/406–408, 405, 410, 418; 370/310.2, 370/328; 379/111, 114.28, 127.02
See application file for complete search history.

(56) References Cited

U.S. PATENT DOCUMENTS

| | | | |
|---|---|---|---|
| 6,163,604 A * | 12/2000 | Baulier et al. | 379/189 |
| 6,181,925 B1 * | 1/2001 | Kaminsky et al. | 455/410 |
| 6,185,416 B1 * | 2/2001 | Rudokas et al. | 455/410 |
| 6,505,039 B1 * | 1/2003 | Boatwright | 455/410 |
| 6,542,729 B1 * | 4/2003 | Chmaytelli et al. | 455/410 |
| 6,628,954 B1 * | 9/2003 | McGowan et al. | 455/461 |
| 7,280,818 B2 * | 10/2007 | Clayton | 455/407 |
| 7,389,106 B2 * | 6/2008 | Dawson et al. | 455/406 |
| 7,995,991 B2 * | 8/2011 | Johnson et al. | 455/408 |
| 2006/0019632 A1 * | 1/2006 | Cunningham et al. | 455/408 |

* cited by examiner

*Primary Examiner* — Steve D Agosta (57) ABSTRACT

A system is provided for managing communication network capacity. The system includes a processor, a data store, an analysis component, and a message component. The data store stores information associated with communication metrics for customers. The analysis component, when executed by the processor, determines a mean and a standard deviation for the communication metrics based on the stored information. The analysis component also determines whether the stored information associated with communication metrics for one of the customers is a predefined number of the standard deviation from the mean for more than a predefined number of days. The message component, when executed by the processor, sends a message to the one of the customers in response to a determination that stored information associated with the communication metrics for the one of the customers is the predefined number of the standard deviation from the mean for more than the predefined number of days.

15 Claims, 6 Drawing Sheets

MANAGING COMMUNICATION NETWORK CAPACITY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Many mobile phones, and other types of communication devices, have become so inexpensive to purchase and use that many customers may purchase a prepaid mobile phone at a convenience store, use the phone, and discard the phone when a prepaid service plan's usage limit is reached. Network service providers offer inexpensive service plans for customers to use their prepaid phones. However, a few customers may abuse their prepaid phone usage by making hundreds of calls in an hour or by making calls that last for fifteen hours. Such abuses may negatively impact a service provider's communication network capacity. The service provider may be challenged to provide network service to some customers because of the impact of a few abusive customers. The service provider may respond to limited network capacity caused by a few abusers by purchasing expensive equipment to expand network capacity.

SUMMARY

In some embodiments, a system is provided for managing communication network capacity. The system includes a processor, a data store, an analysis component, and a message component. The data store stores information associated with communication metrics for customers. The analysis component, when executed by the processor, determines a mean and a standard deviation for the communication metrics based on the stored information. The analysis component also determines whether the stored information associated with communication metrics for one of the customers is a predefined number of the standard deviation from the mean for more than a predefined number of days. The message component, when executed by the processor, sends a message to the one of the customers in response to a determination that stored information associated with the communication metrics for the one of the customers is the predefined number of the standard deviation from the mean for more than the predefined number of days.

In some embodiments, a method is provided for managing communication network capacity. Information associated with communication metrics for customers is stored. A mean and a standard deviation for the communication metrics are determined based on the stored information. Whether stored information associated with communication metrics for one of the customers is a predefined number of the standard deviation from the mean for more than a predefined number of days is determined. A message is sent to the one of the customers in response to a determination that stored information associated with the communication metrics for the one of the customers is the predefined number of the standard deviation from the mean for more than the predefined number of days. The message conveys one of an offer to assist with service, an encouragement to update a service plan in response to a determination of excessive usage, a notification of logging subsequent communications to ensure proper service, an acceptable usage policy, and a warning that action will be taken if improper usage does not stop In some embodiments, a system is provided for managing communication network capacity. The system includes a processor, a data store, an analysis component, and a message component. The data store stores information associated with communication metrics for customers. The analysis component, when executed by the processor, determines a mean and a standard deviation for the communication metrics based on the stored information. The analysis component also determines whether stored information associated with communication metrics for one of the customers is a predefined number of the standard deviation from the mean. Additionally, the analysis component determines whether the stored information associated with the communication metrics for the one of the customers is the predefined number of the standard deviation from the mean for more than a predefined number of days in response to a determination that the stored information associated with the communication metrics for the one of the customers is the predefined number of the standard deviation from the mean. The message component, when executed by the processor, sends a message to the one of the customers in response to a determination that the stored information associated with the communication metrics for the one of the customers is the predefined number of the standard deviation from the mean for more than the predefined number of days.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some embodiments, a system is provided for managing communication network capacity. An analysis component of the system calculates a group mean and a group standard deviation for customer communication metrics based on communications information for a group of customers. The analysis component also determines whether each customer's individual mean is displaced more than a significant number of the group standard deviations from the group mean. For example, if the group mean for the number of calls in an hour is 2.5, and the group standard deviation for the number of calls in an hour is 5, then a customer may be identified as a potentially abusive customer if the customer's individual average is more than 20 calls an hour, which is more than 3 group standard deviations from the group mean of 2.5 calls per hour. (3 group standard deviations of 5 equals 15, and 20 is more than 15 plus the group mean of 2.5 calls.) In another example, if the group mean for the duration of calls is 6 minutes, and the group standard deviation for the duration of a call is 15 minutes, then a customer may be identified as a potentially abusive customer if the customer's individual average is more than 125 minutes per call, which is more than 3 group standard deviations from the group mean of 6 minutes per calls. (3 group standard deviations of 15 equals 45, and 125 is more than 45 plus the group mean of 6 minutes.) Once a customer is identified as a potentially abusive customer, the analysis component tracks the customer's information for days to determine if the potentially abusive behavior is normal or abnormal for the customer. If the potentially abusive behavior discontinues after a day or two, no action may be necessary.

However, if the identified customer continues the potentially abusive behavior over many days, a message component of the system sends a voice message or a text message to the customer. The message may be an offer to assist the customer with using the phone, which may be helpful if problems with hardware, software, or reception are causing the observed behavior. If the customer is using the phone for unauthorized purposes, such as machine-to-machine communications or as an all day baby monitor, customer care center tests indicate that the customer may respond to the message by stopping the unauthorized usage or discontinuing usage altogether.

If abuse continues after the offer for assistance has been sent, the message component may send a message notifying the customer that all of the customer's subsequent communications will be logged to ensure proper service. Such logging may assist in solving communication problems for legitimate customers. However, a customer who is using their phone to convey thousands of signals via the call recipient viewing caller identification information, rather than verbal communications, may stop such abusive usage upon receiving this message because the customer may not want law enforcement agencies to be aware of the thousands of uncompleted calls. The message component may send these messages to customers during off-peak hours based on priorities, such as sending the first message to the most abusive customer, the second message to the second-most abusive customer, etc. Finally, if the customer continues the abusive behavior, the next message may be a warning that action will be taken if improper usage does not stop, such as service termination. The system may also redirect calls from a potentially abusive customer to a customer care center instead of the number entered by the customer. If a customer has a valid reason for the observed behavior, such as phone hardware problems, a customer care representative may remove the customer from the list of customers that receive messages and/or have their calls redirected. Embodiments of the present disclosure enable a network service provider to manage network capacity for all customers by identifying a few potentially abusive customers and sending messages to these customers, without having to terminate any customer's service except for the most severe abuses.

Figure 1:
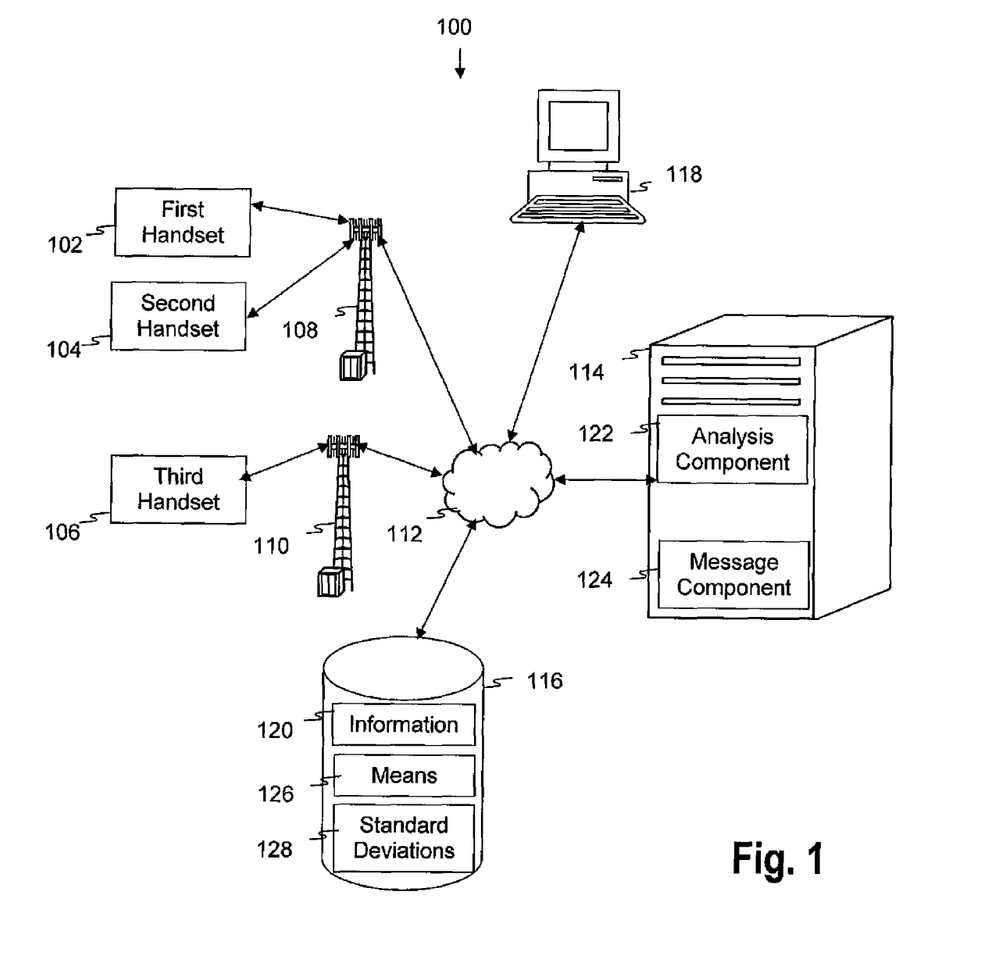
FIG. 1 illustrates a wireless communications system for managing communication network capacity according to some embodiments of the present disclosure.

FIG. 1 shows a wireless communications system 100 that illustrates the context for the present disclosure's systems and methods. The system 100 includes a first handset 102, a second handset 104, a third handset 106, a first base transceiver station (BTS) 108, a second base transceiver station 110, a network 112, a server 114 a data store 116, and a customer care center 118. The first handset 102, the second handset 104, and the third handset 106 can communicate via the network 112. The network 112 may provide access for the handsets 102-106 to information on various servers, such as the server 114. The server 114 may access the data store 116 to provide content via the network 112 to the handsets 102-106. The handsets 102-106 may also communicate with the customer care center 118 via the network 112 for assistance with communication services.

The server 114, another server, or some other node on the network 112 can store information 120 on the data store 116, such as customer communication information for the handsets 102-106. The information 120 may be historical information based on metrics of previous communications via the handsets 102-106 and/or current information accumulated as customers communicate via the handsets 102-106. The server 114 includes an analysis component 122 and a message component 124 that may directly or indirectly use the information 120.

The analysis component 122 calculates means 126 and standard deviations 128 for customer communication metrics based on the information 120 for a group of customers. Although the group of customers could include all of the network service provider's customers, the analysis component 122 may calculate means 126 and standard deviations 128 based on a smaller group of randomly selected customers. The group of randomly selected customers used for calculations is small enough to reduce the processing load required for the analysis component 122 to calculate the means 126 and standard deviations 128 for all customers, but the group of randomly selected customers is large enough to produce a statistically significant sample size. The analysis component 122 may also calculate means 126 and standard deviations 128 for groups of customers across multiple related accounts, where the groups are selected based on their geographic location, their type of service, their service plan, their payment history, and/or their total volume of payments.

The analysis component 122 stores the calculated means 126 and standard deviations 128 on the data store 116. The means 126 and the standard deviations 128 may include means 126 and standard deviations 128 for communication metrics duration and/or means 126 and standard deviations 128 for communication metrics frequency. The analysis component 122 may calculate the means 126 and the standard deviations 128 based only on customer communications that occur during a predefined peak communication time range, such as 9 AM to 5 PM on Mondays through Fridays, because network capacity may not be a concern outside of peak communication times. However, the analysis component 122 may also calculate the means 126 and the standard deviations 128 based only on customer communications that occur during other predefined communication time ranges, such as on weekends. The peak communication times may be based on the origin of a communication or the destination of the communication. The analysis component 122 may also calculate the means 126 and the standard deviations 128 based only on metrics for customer communications that occur during "busy hours," such as specific times when the remaining network capacity is reduced to a predefined threshold, because network capacity may not be a concern outside of busy hours. The analysis component 122 may occasionally recalculate the means 126 and the standard deviations 128 based on metrics for subsequent communications to ensure that the most recent data is used for comparisons. For example, the analysis component 122 may calculate the means 126 and the standard deviations 128 based on a sliding window method, such as calculating the means 126 and the standard deviations 128 over the 7 most recent days or the 5 most recent business days. The analysis component 122 may base calculations on a holiday schedule, such that calculations for the 5 previous business days would not include metrics for communications that occurred during a holiday that fell on the previous Wednesday.

The analysis component 122 determines whether a customer's communication information is a predefined number of the standard deviations 128 from the means 126 to tag customers who may be potentially abusive customers. The analysis component 122 determines if each tagged customer's communication information is the predefined number of the standard deviations 128 from the means 126 for more than a predefined number of days. While a small percentage of customers may be tagged as potentially abusive customers, an even smaller number of these tagged customers will repeat the potentially abusive usage for many days. The analysis component 122 may simply compile a list of tagged customers at the end of each day, and compare this list to previous days' lists to identify the potentially abusive customers. If the analysis component 122 calculates the means 126 and the standard deviations 128 for the peak communication times only, the analysis component 122 compares each customer's communication information for the peak communication times only. When the analysis component 122 identifies a potentially abusive customer, the analysis component 122 may provide the identified customer's communication information to the customer care center 118 for possible use by a customer care representative.

The message component 124 sends a voice message and/or a text message to customers identified as potentially abusive customers by the analysis component 122. The message may convey an offer to assist with service, a notification of logging subsequent communications to ensure proper service, and/or a warning that action will be taken if improper usage does not stop. The message may also convey an acceptable usage policy to discourage unacceptable usage, and/or an encouragement for a customer to update a service plan to compensate for excessive usage. Because of the concerns with managing network capacity, the message component 124 may send the message at a time outside of peak communication time. The message component 124 may send the message based on a message priority established for each of the customers, such as sending the message first to a customer who averaged more than 1,000 calls an hour for 10 days, then to a customer who averaged 750 calls an hour for 9 days, etc. The message component 124 may stop sending messages to customers when network capacity decreases, such as when peak communication time returns, without sending the messages to every customer on the priority list. The message component 124 may begin sending messages to customers again when network capacity increases, starting with customers who may have been added to the list with a higher priority than the customers who have not received their messages yet.

The analysis component 122 may also analyze communication patterns to identify multiple handsets associated with an identified customer based on cell sectors used for communication origins and/or communication destinations. For example, the message component 124 sends a message on Monday to the first handset 102 because the first handset 102 averaged 1,250 calls an hour the previous week from sector Alpha for the first base transceiver station 108 to sector Beta for the second base transceiver station 110. Then the analysis component 122 determines that although usage of the first handset 102 stopped after the message was sent on Monday, the second handset 104 averaged 1,250 calls an hour on Tuesday and Wednesday from sector Alpha for the first base transceiver station 108 to sector Beta for the second base transceiver station 110. If the analysis component 122 links the second handset 104 with the first handset 102 based on the similar communication patterns, the message component 124 sends the message that was sent to the first handset 102 to the second handset 104 as well, without waiting for a full week's worth of data to establish the abusive behavior. The analysis component 122 may analyze the subsequent communication metrics of customers who received messages to evaluate how effectively each type of message impacted each type of customer behavior.

The network 112 may direct a potentially abusive customer's communication to the customer care center 118 for a recorded message and/or a customer care representative, who may use the customer's communication information provided by the analysis component 122 when communicating with the customer. The customer may complain about their communication being redirected to the customer care center 118 and/or receiving a message. If the customer offers a valid reason for the observed usage, such as hardware malfunction or limited reception, the customer care representative may remove the customer from a list of customers that receive messages and/or have their calls redirected. If the customer care representative does not accept the customer's usage explanation, the customer is retained on the list.

The network 112 may modify a communication priority for potentially abusive customers, such as dropping a customer from a top priority for call connection to a lower priority for call connection. This priority change enables other customers to connect before the network attempts to connect calls for the potentially abusive customer. When the network changes a customer's priority, the message component 124 may send a message that offers an opportunity for the customer to pay more and upgrade their service plan, which would improve the customer's connection priority. The network 112 may even drop the connected call of a low priority customer when network capacity diminishes to provide network capacity for higher priority customers.

Although FIG. 1 depicts the server 114 as separate from the data store 116, the server 114 can include any combination of the capabilities and functions of the data store 116. The number of each of the elements 102-128 are depicted in FIG. 1 as an illustrative example, as the system 100 may include any number and type of the elements 102-128.

Figure 2:
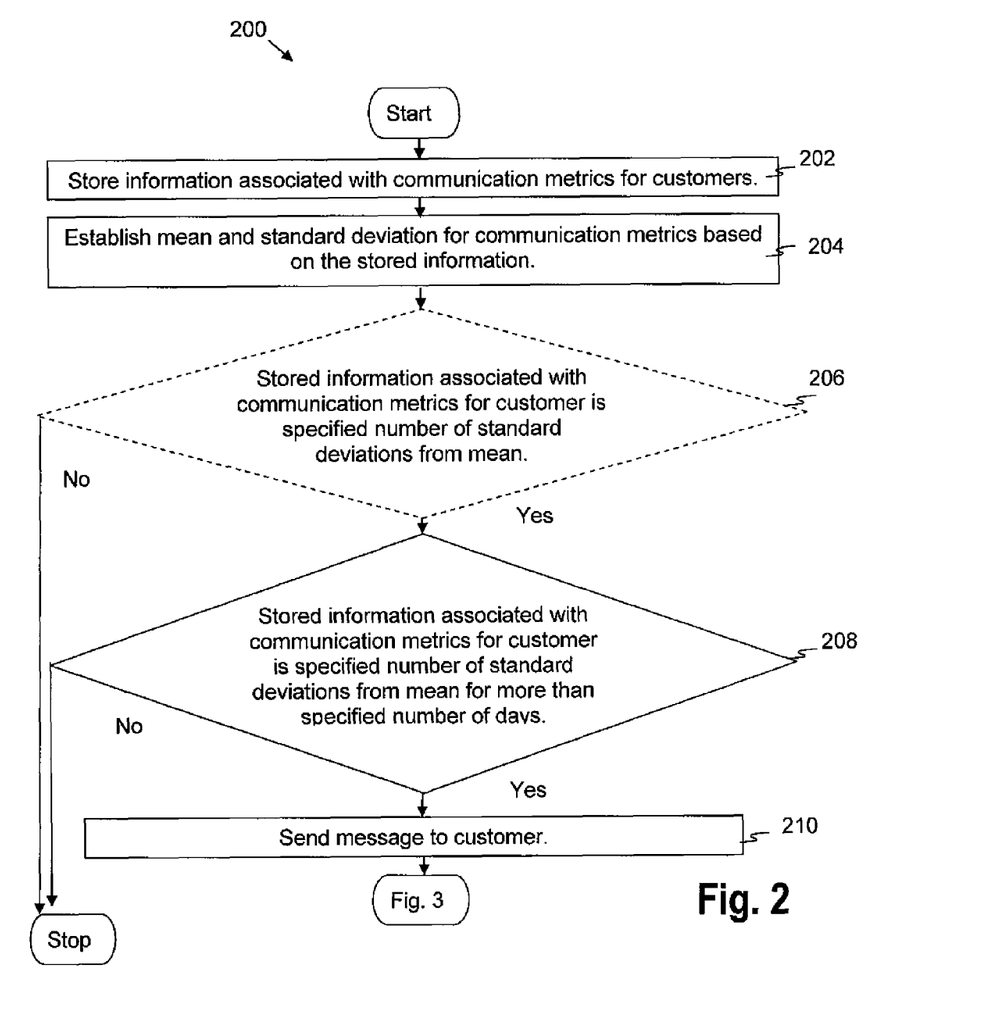
FIG. 2 is a flowchart of a method for managing communication network capacity according to some embodiments of the present disclosure.

FIG. 2 shows a flowchart of a method 200 for managing communication network capacity according to some embodiments of the present disclosure. The system 100 can execute the method 200 to send messages to potentially abusive customers' handsets.

In box 202, information associated with communication metrics for customers is stored. For example, the server 114 stores the information 120 for customers who use the handsets 102-106.

In box 204, a mean and a standard deviation are established for communication metrics based on the stored information. For example, the analysis component 122 establishes a group mean and a group standard deviation for the metrics of frequency of communications based on the information 120 for a group of handsets 102-106.

In box 206, whether the stored information associated with communication metrics for a customer is a predefined number of standard deviations from a mean is optionally determined. For example, the analysis component 122 determines whether the communication frequency average for the first handset 102 in the information 120 is more than 3 group standard deviations from the group frequency mean of 2.5 calls per hour. If the communication frequency average for the first handset 102 is less than 3 group standard deviations from the group frequency mean of 2.5 calls per hour, the method terminates. If the communication frequency average for the first handset 102 is more than 3 group standard deviations from the group frequency mean of 2.5 calls per hour, the method continues to box 208.

In box 208, whether the stored information associated with the communication metrics for the customer is the predefined number of standard deviations from the mean for more than a predefined number of days is determined. For example, the analysis component 122 determines whether the communication frequency average for the first handset 102 in the information 120 is more than 3 group standard deviations from the group frequency mean of 2.5 calls per hour for more than 7 days. If the communication frequency average for the first handset 102 is not more than 3 group standard deviations from the group frequency mean of 2.5 calls per hour for more than 7 days, the method terminates. If the communication frequency average for the first handset 102 is more than 3 group standard deviations from the group frequency mean of 2.5 calls per hour for more than 7 days, the method continues to box 210.

In box 210, a message is sent to the customer. For example, the message component 124 sends a message to the first handset 102 offering to assist with service.

Figure 3:
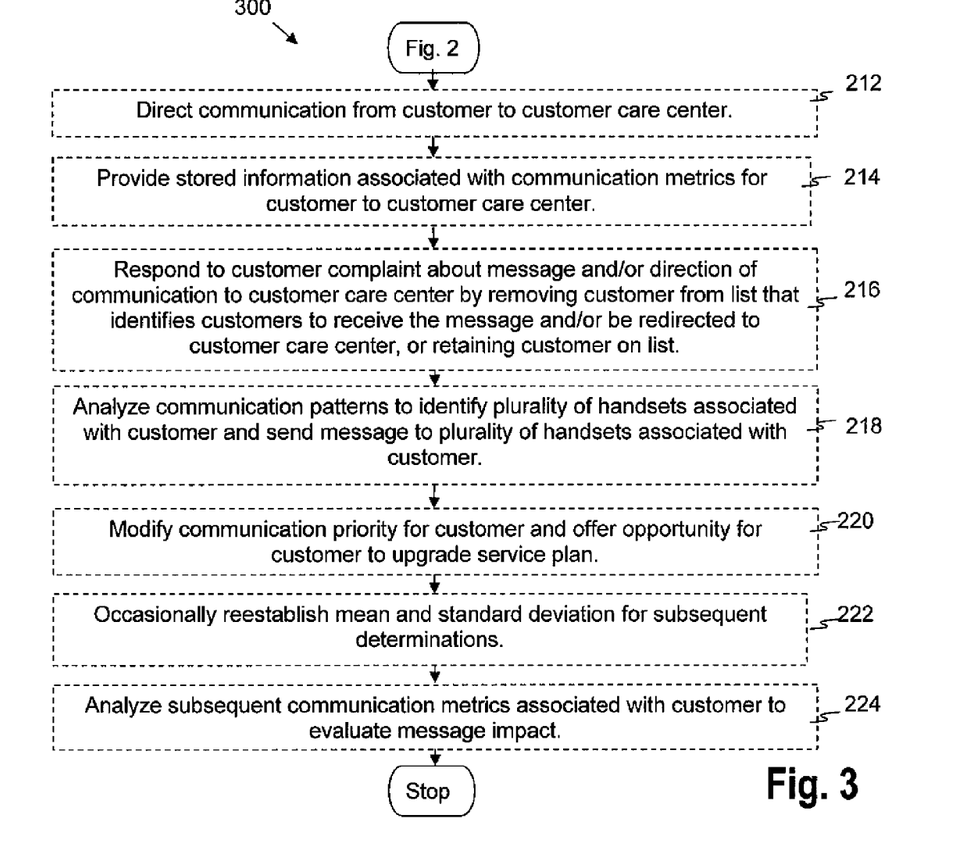
FIG. 3 is another flowchart of a method for managing communication network capacity according to some embodiments of the present disclosure.

FIG. 3 shows a flowchart of a method 300 for managing communication network capacity according to some embodiments of the present disclosure. The system 100 can execute the method 300 to direct potentially abusive customers to a customer care center, lower communication priorities for potentially abusive customers, and identify other handsets used by potentially abusive customers.

In box 212, communication from the customer is optionally directed to a customer care center. For example, the network 112 directs communication from the handset 102 to the customer care center 118.

In box 214, the stored information associated with the communication metrics for the customer is optionally provided to the customer care center. For example, the analysis component 122 provides the communication frequency average for the handset 102 in the information 120 to the customer care center 118.

In box 216, a customer complaint about a message and/or a direction of a communication to the customer care center is optionally responded to by removing the customer from a list that identifies customers to receive the message and/or be redirected to the customer care center, or by retaining the customer on the list. For example, a customer care representative responds to a customer complaint about receiving a message and an explanation of a handset hardware malfunction by removing the customer from the list that identifies customers to receive the message and to be redirected to the customer care center.

In box 218, communication patterns are optionally analyzed to identify a plurality of handsets associated with the customer and to send the message to the plurality of handsets associated with the customer. For example, the analysis component 122 analyzes communication patterns in the information 120 to identify that the customer who made 1,250 calls the previous week on the first handset 102 from sector Alpha for the first base transceiver station 108 to sector Beta for the second base transceiver station 110 is most likely the same customer who is making 1,250 calls this week on the second handset 104 from sector Alpha for the first base transceiver station 108 to sector Beta for the second base transceiver station 110. In response to this newly identified abuse, the message component 124 sends messages to the handsets 102 and 104.

In box 220, a communication priority is optionally modified for the customer and an opportunity is offered for the customer to upgrade a service plan. For example, the network 112 lowers the potentially abusive customer's communication priority and the message component 124 sends a message to the handset 102 that offers an opportunity for the potentially abusive customer to upgrade their service plan.

In box 222, means and standard deviations are optionally occasionally reestablished for subsequent determinations. For example, the analysis component 122 occasionally recalculates the means 126 and the standard deviations 128 based on metrics for subsequent customer communications.

In box 224, subsequent communication metrics associated with the customer are optionally analyzed to evaluate a message impact. For example, the analysis component 122 analyzes the customer's subsequent communication metrics to evaluate the impact of the message component 124 sending the messages to the first handset 102.

Figure 4:
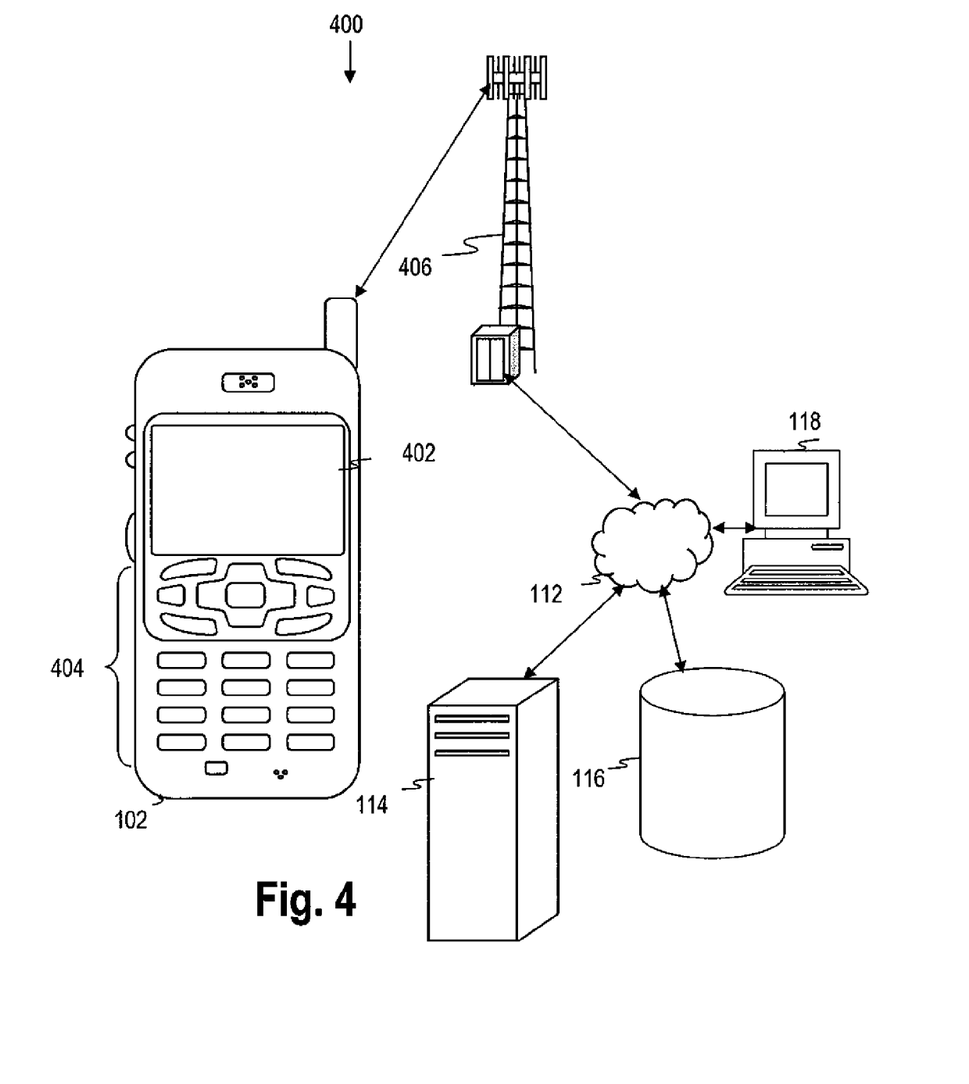
FIG. 4 illustrates another wireless communications system for managing communication network capacity according to some embodiments of the present disclosure.

FIG. 4 shows a wireless communications system 400 including the first handset 102, which may be referred to as the mobile device 102. FIG. 4 depicts mobile device 102 as a mobile phone, which is operable for implementing aspects of the present disclosure, but the present disclosure should not be limited to these implementations. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable mobile devices 102 combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 402 to show a web page. The web page may be obtained via wireless communications with a base transceiver station (BTS) 406, a wireless network access node, a peer mobile device 102 or any other wireless communication network or system. While a single base transceiver station 406 is illustrated, it is understood that the wireless communication system may comprise additional base transceiver stations. In some instances, the mobile device 102 may be in communication with multiple base transceiver stations 406 at the same time. The base transceiver station 406 (or wireless network access node) is coupled to the network 112, such as the Internet. Via the wireless link and the network 112, the mobile device 102 has access to information on various servers, such as the server 114. The server 114 may access the data store 116 to provide content that may be shown on the display 402. Alternately, the mobile device 102 may access the base transceiver station 406 through a peer mobile device 102 acting as an intermediary, in a relay type or hop type of connection. The customer care center 118 may also communicate via the network 112.

Figure 5:
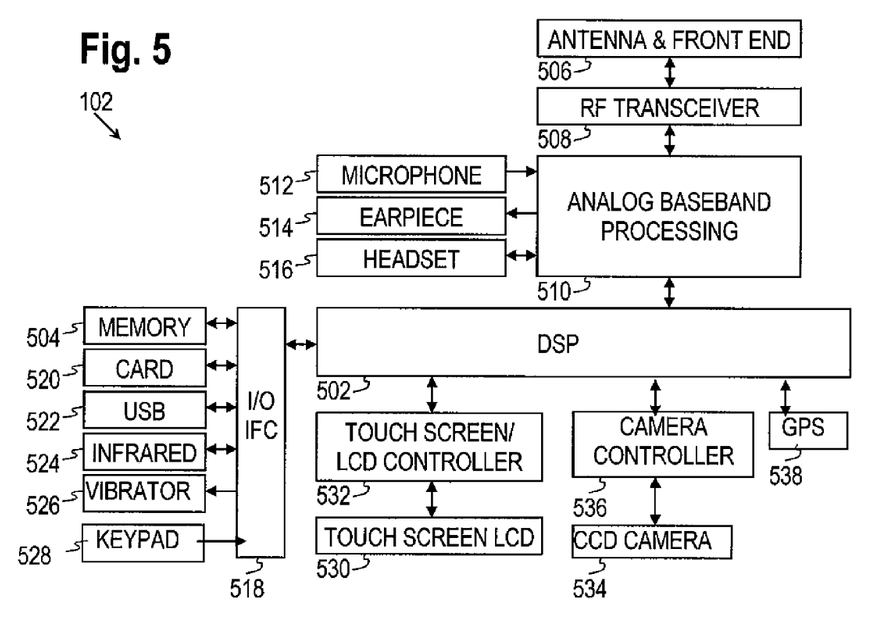
FIG. 5 is a block diagram of an illustrative mobile device.

FIG. 5 shows a block diagram of the mobile device 102. While a variety of known components of mobile devices 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 408, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby mobile devices 102 and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
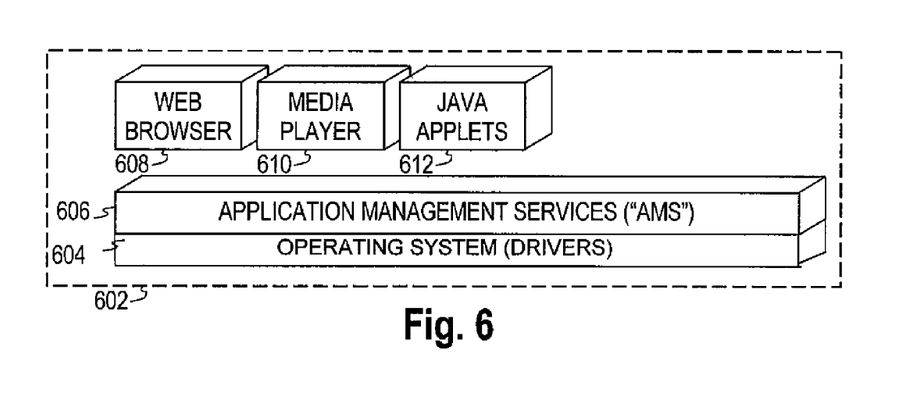
FIG. 6 is a block diagram of an illustrative software configuration for a mobile device.

FIG. 6 illustrates a software environment 602 that may be implemented by the DSP 502. The DSP 502 executes operating system drivers 604 that provide a platform from which the rest of the software operates. The operating system drivers 604 provide drivers for the mobile device hardware with standardized interfaces that are accessible to application software. The operating system drivers 604 include application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality.

Figure 7:
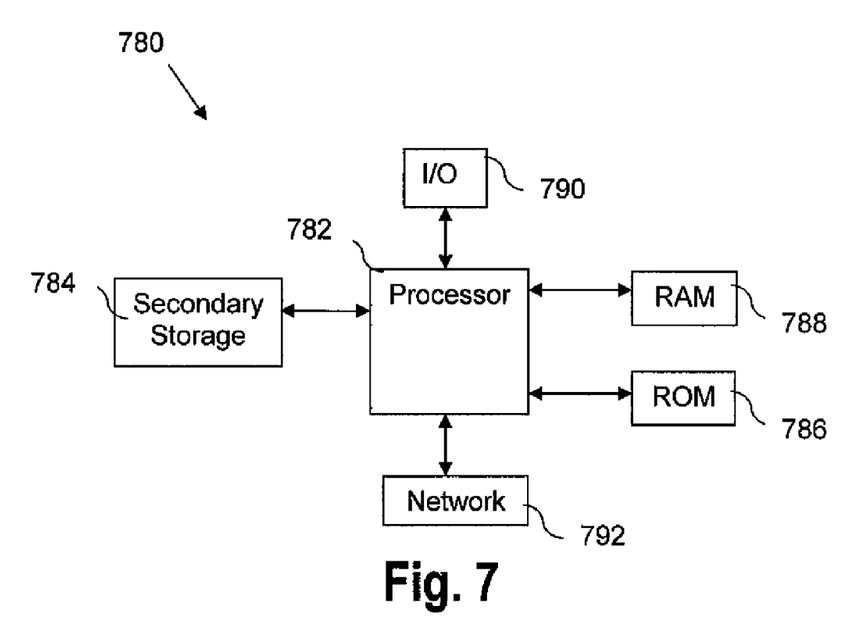
FIG. 7 illustrates an exemplary general purpose computer system suitable for implementing the several embodiments of the disclosure.

Some aspects of the system described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for managing communication network capacity, comprising:
   a processor;
   a data store to store information associated with communication metrics for customers;
   an analysis component, when executed by the processor, to determine a mean and a standard deviation for the communication metrics based on the stored information, to determine whether the stored information associated with communication metrics for one of the customers is a predefined number of the standard deviation from the mean for more than a predefined number of days, and to analyze communication patterns to identify a plurality of handsets associated with the one of the customers based on cell sectors used for at least one of a communication origin and a communication destination; and
   a message component, when executed by the processor, to send a message to the plurality of handsets associated with the one of the customers in response to a determination that stored information associated with the communication metrics for the one of the customers is the predefined number of the standard deviation from the mean for more than the predefined number of days, wherein the message conveys one of an offer to assist with service, an encouragement to update a service plan in response to a determination of excessive usage, a notification of logging subsequent communications to ensure proper service, an acceptable usage policy, and a warning that action will be taken if improper usage does not stop.

2. The system of claim 1, wherein the stored information is historical information based on previous communication metrics.

3. The system of claim 1, wherein the mean and the standard deviation for the communication metrics comprise one of a mean and a standard deviation for communication metrics duration and a mean and a standard deviation for communication metrics frequency.

4. The system of claim 1, wherein the mean and the standard deviation for the communication metrics are further based on communication metrics that occur during one of a predefined peak communication time range and a predefined communication time range.

5. The system of claim 1, wherein the message is one of a voice message and a text message.

6. The system of claim 1, wherein the message component sends the message to a handset that is at least one of a mobile phone, a wireless handset, a pager, a personal digital assistant, a gaming device, an inventory control device, a media player, a digital camera, a digital calculator, a portable computer, a tablet computer, and a laptop computer.

7. A method for managing communication network capacity, comprising:
   storing information associated with communication metrics for customers;
   determining, by an analysis component stored on a non-transitory computer readable medium and executable by a processor, a mean and a standard deviation for the communication metrics based on the stored information;
   determining, by the analysis component, whether stored information associated with communication metrics for one of the customers is a predefined number of the standard deviation from the mean for more than a predefined number of days;
   sending, by a message component stored on a non-transitory computer readable medium and executable by a processor, a message to the one of the customers in response to a determination that stored information associated with the communication metrics for the one of the customers is the predefined number of the standard deviation from the mean for more than the predefined number of days, wherein the message conveys one of an offer to assist with service, an encouragement to update a service plan in response to a determination of excessive usage, a notification of logging subsequent communications to ensure proper service, an acceptable usage policy, and a warning that action will be taken if improper usage does not stop;
   directing a communication from the one of the customers to a customer care center; and
   responding to a customer complaint about one of a message and a direction of a communication to the customer care center by one of removing the one of the customers from a list that identifies customers to one of receive the message and have a communication redirected to the customer care center, and retaining the one of the customers on the list.

8. The method of claim 7, wherein directing the communication from the one of the customers to the customer care center comprises directing the communication to at least one of a recorded message and a customer care representative.

9. The method of claim 7, further comprising providing the stored information associated with the communication metrics for the one of the customers to the customer care center.

10. A method for managing communication network capacity, comprising:
    storing information associated with communication metrics for customers;
    determining, by an analysis component stored on a non-transitory computer readable medium and executable by a processor, a mean and a standard deviation for the communication metrics based on the stored information;
    determining, by the analysis component, whether stored information associated with communication metrics for one of the customers is a predefined number of the standard deviation from the mean for more than a predefined number of days;

sending, by a message component stored on a non-transitory computer readable medium and executable by a processor, a message to the one of the customers in response to a determination that stored information associated with the communication metrics for the one of the customers is the predefined number of the standard deviation from the mean for more than the predefined number of days, wherein the message conveys one of an offer to assist with service, an encouragement to update a service plan in response to a determination of excessive usage, a notification of logging subsequent communications to ensure proper service, an acceptable usage policy, and a warning that action will be taken if improper usage does not stop; and analyzing, by the analysis component, communication patterns to identify a plurality of handsets associated with the one of the customers and sending, by the message component, the message to the plurality of handsets associated with the one of the customers, wherein analyzing communication patterns comprises analyzing the communication patterns based on cell sectors used for at least one of a communication origin and a communication destination.

11. The method of claim 7, further comprising modifying a communication priority for the one of the customers and offering an opportunity for the one of the customers to upgrade a service plan.

12. The method of claim 7, further comprising occasionally reestablishing the mean and the standard deviation for subsequent determinations.

13. The method of claim 7, further comprising analyzing subsequent communication metrics associated with the one of the customers to evaluate a message impact.

14. The system of claim 1, wherein the message component sends the message at a time outside of a predefined peak communication time range.

15. The system of claim 1, wherein the message component sends the message based on a message priority established for the one of the customers.

* * * * *